United States Patent
Lin et al.

(10) Patent No.: US 9,182,902 B2
(45) Date of Patent: Nov. 10, 2015

(54) CONTROLLING METHOD FOR FIXING A SCALE RATIO OF BROWSING IMAGE OF TOUCH DEVICE

(71) Applicant: HYWEB TECHNOLOGY CO., LTD, Hsinchu (TW)

(72) Inventors: Yu-Yu Lin, Hsinchu (TW); Kai-Chieh Lu, Hsinchu (TW)

(73) Assignee: Hyweb Technology Co., Ltd., Hsinchu (TW)

( * ) Notice: Subject to any disclaimer, the term of this patent is extended or adjusted under 35 U.S.C. 154(b) by 261 days.

(21) Appl. No.: 13/863,770

(22) Filed: Apr. 16, 2013

(65) Prior Publication Data
US 2013/0278518 A1    Oct. 24, 2013

(30) Foreign Application Priority Data
Apr. 18, 2012 (TW) .............................. 101113793 A

(51) Int. Cl.
G06F 3/0488 (2013.01)

(52) U.S. Cl.
CPC .... G06F 3/0488 (2013.01); *G06F 2203/04806* (2013.01); *G06F 2203/04808* (2013.01)

(58) Field of Classification Search
USPC ........... 456/156, 168, 173; 715/764, 788, 800
See application file for complete search history.

(56) References Cited

U.S. PATENT DOCUMENTS

| | | | |
|---|---|---|---|
| 7,231,231 B2 * | 6/2007 | Kokko et al. .................. | 455/566 |
| 2009/0284495 A1 * | 11/2009 | Geaghan et al. .............. | 345/174 |
| 2013/0162684 A1 * | 6/2013 | Williams ....................... | 345/650 |
| 2013/0169573 A1 * | 7/2013 | Nishio .......................... | 345/173 |
| 2013/0239049 A1 * | 9/2013 | Perrodin et al. .............. | 715/800 |

* cited by examiner

*Primary Examiner* — Srilakshmi K Kumar
*Assistant Examiner* — Jeffrey S Steinberg
(74) *Attorney, Agent, or Firm* — Kolisch Hartwell, P.C.

(57) ABSTRACT

Disclosed is a controlling method for fixing a scale ratio of browsing images of a touch device. The controlling method comprises the steps of: determining a zooming region on a display screen, which is determined by pinching the browsing image from a selected position to thus zoom in or zoom out the browsing image, and the scale ratio of zooming is accordingly determined; displaying a screen-locking icon on the display screen, wherein the scale ratio is locked when the screen-locking icon is triggered to be in a locking state; and displaying the other browsing images with the same scale ratio of zooming and with a viewing size same as the zooming region.

7 Claims, 6 Drawing Sheets

CONTROLLING METHOD FOR FIXING A SCALE RATIO OF BROWSING IMAGE OF TOUCH DEVICE

CROSS-REFERENCE TO RELATED APPLICATION

This application claims priority to Taiwanese Patent Application No. 101113793, filed Apr. 18, 2012, which is hereby incorporated by reference.

FIELD OF THE INVENTION

The present invention relates to a method of zooming an image of a touch device, and more particularly to a controlling method for fixing a scale ratio of browsing images of a touch device.

BACKGROUND OF THE INVENTION

With the rapid progress of science and technology, electronic products, such as the tablet PC and the cell phone which are light, thin, small, and portable, have been developed to provide much convenience to people and improve the life quality. Most of the electronic products are equipped with an input device for inputting information, for example, a mouse or a keyboard, but such input devices are not thin and simplicity. As the result, new generation of input devices, such as a touch panel, are provided and have been applied to various electronic devices. In a touch panel, there is provided with a touching region that corresponds to a displaying region, so that a user can control the electronic products by sliding or touching icons that is displayed on the touch panel to execute the corresponding function.

The size of touch panel of an electronic product is always limited, and therefore it is inconvenient to show all icons of the touch panel.

In the electronic product, it generally provides a zooming function for zooming in/out an image to a desired scale. In a general image zooming method, a user selects a region of the panel that is to be zoomed at first, and the user determine to zoom in or zoom out for the selected region, and finally the user determines a scale of zooming ratio or a defaulted scale of zooming ratio is applied.

However, the above image zooming method has drawback as follows. One of the problems is that the procedure of operation is complicated, which includes a step that a user has to select the region to be zoomed, a step that a user has to choose either zoom in or zoom out function for the selected region, and a step that a user should select the scale ratio for zoom in or zoom out function. Besides, in the conventional method of locking a region of the touching device, the device generate a block on the displaying panel, and a user "drag" or "align" the block to determine the region to be locked. The conventional method is inconvenient.

SUMMARY OF THE INVENTION

Accordingly, the present invention provides a controlling method for fixing a scale ratio of browsing images of a touch device to improve the drawback of conventional touch device when the zooming is operated.

In one of the aspect, the present invention overcomes the drawbacks of the prior art by providing a controlling method for fixing a scale ratio of browsing images of a touch device, which performs a displaying area control of a browsing image shown on a display screen, the controlling method comprises the steps of: (a) determining a zooming region on a display screen, which is determined by pinching the browsing image from a selected position to thus zoom in or zoom out the browsing image, and the scale ratio of zooming is accordingly determined; (b) displaying a screen-locking icon on the display screen, wherein the scale ratio is locked when the screen-locking icon is triggered to be in a locking state; and (c) displaying the other browsing images with the same scale ratio of zooming and with a viewing size same as the zooming region.

In another aspect of the present invention, it further comprises a step (d), after the step (c), of restoring the scale ratio of the present browsing image to an original scale ratio when the screen-locking icon is triggered to be in an unlocking state.

In another aspect of the present invention, wherein the scale ratio of the other browsing images is restored to the original scale ratio when the screen-locking icon is triggered to be in an unlocking state.

In another aspect of the present invention, wherein in step (a), the zooming region is determined by pinching the browsing image from the selected position and extending outward to enlarge the scale ratio of zooming, and the scale ratio of zooming is thus determined.

In another aspect of the present invention, wherein in step (a), the zooming region is determined by pinching the browsing image from the selected position and extending inward to minify the scale ratio of zooming, and the scale ratio of zooming is thus determined.

In another aspect of the present invention, wherein the browsing image on the touch device contains one or more of text, graph, symbol, and video.

In another aspect of the present invention, it further comprises, after step (b), a step of adjusting the scale ratio of zooming by touching the display screen and changing the zooming region to determine another scale ratio of zooming.

In another aspect of the present invention, wherein the touch device is a tablet computer, a smart phone, or an electronic device with touch function.

In the controlling method for fixing a scale ratio of browsing images of a touch device of the present invention, a user pinches the image by fingers to determine the area to be displayed, and at the same time the scale ratio of zooming is determined and can be locked. The zooming operation is performed based on the movement of the fingers. The operation of locking the scale ratio of zooming is allowable. After the scale of ratio is locked, all following image will be displayed in that scale of ratio.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
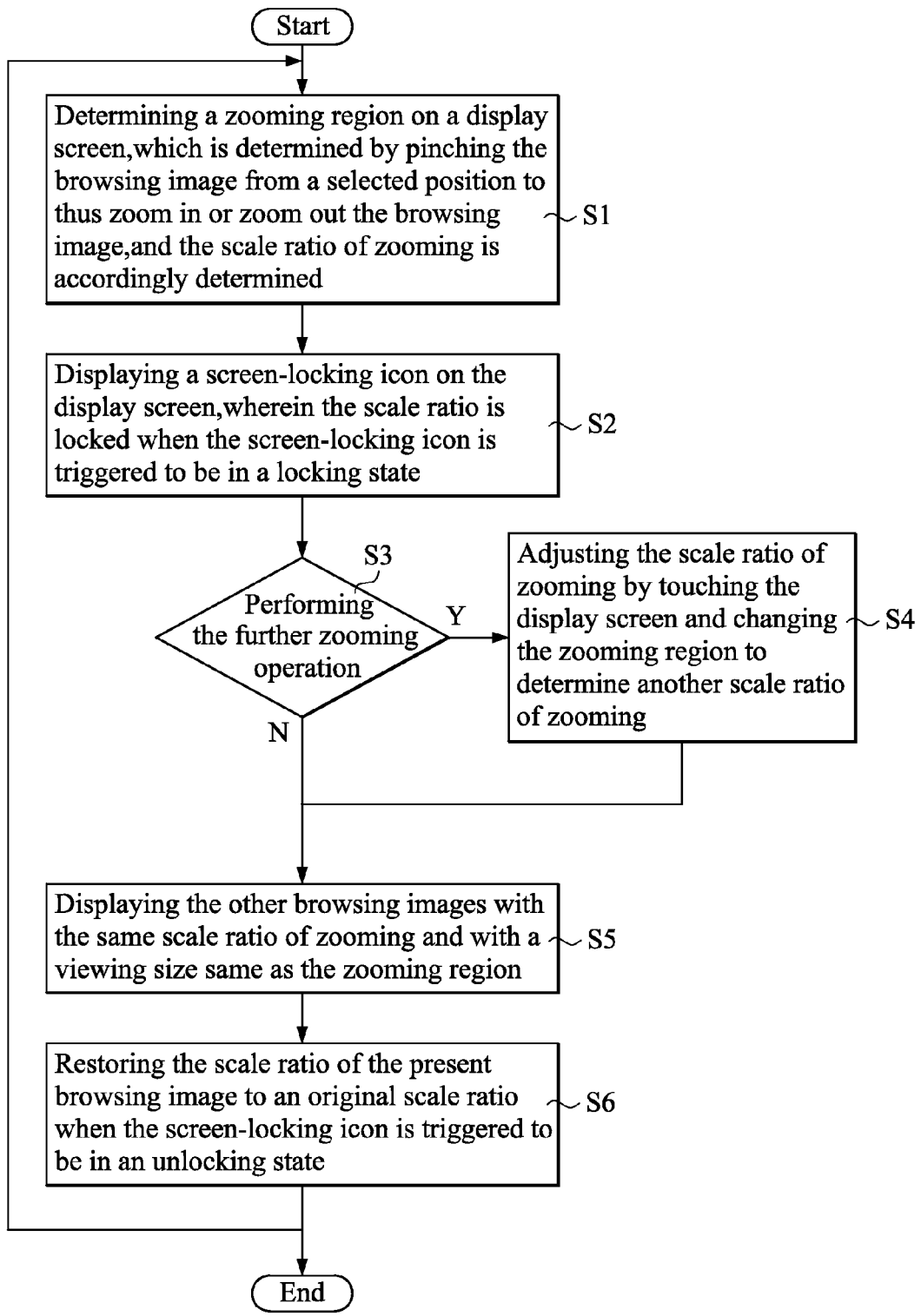
FIG. 1 is a flowchart illustrating the controlling method for fixing browsing image to zoomed region of touch device of the embodiment according to the present invention.
Figure 2:
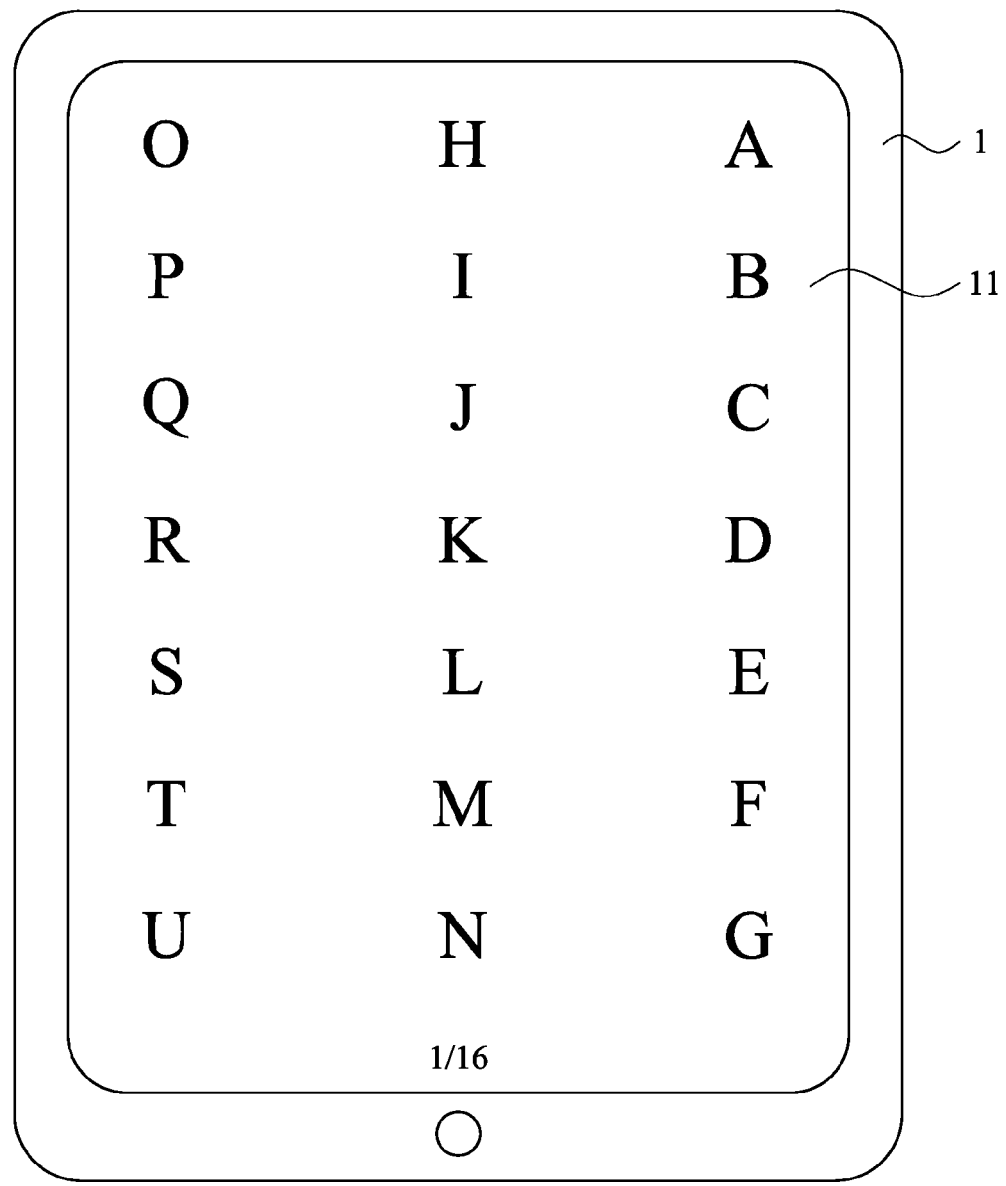
FIG. 2 to FIG. 6 are operating schematic diagrams illustrating the controlling method for fixing browsing image to zoomed region of touch device of the embodiment according to the present invention.
Figure 3:
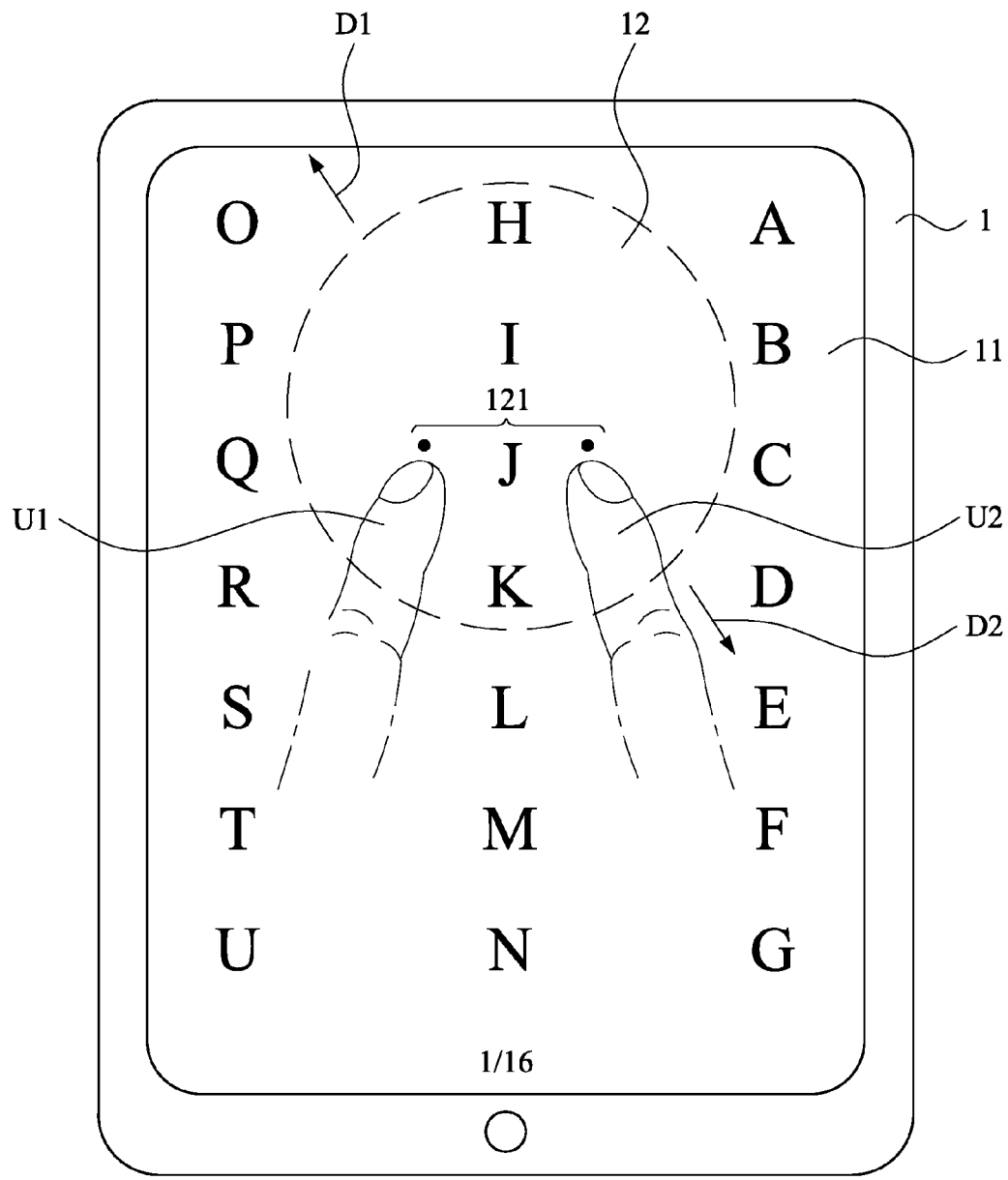

Please refer to FIG. 1 to FIG. 6, FIG. 1 is a flowchart of the controlling method for locking zoomed region, FIG. 2 to FIG.

6 are operating schematic diagrams of the controlling method for fixing browsing image to zoomed region of touch device.

A controlling method for fixing a scale ratio of browsing images of a touch device according to the present invention is applied to control a displaying region of a browsing image on a touch device 1. The touch device 1 includes a tablet computer, a smart phone, or any electronic devices with touch function. In this embodiment, the touch device 1 is exampled as a tablet computer and a method of controlling the operation of zooming in is described in FIG. 2 to FIG. 6.

A program, which performs the controlling method for fixing a scale ratio of browsing images of a touch device according to the present invention is built and executed in the touch device 1. First, in FIG. 3, a user touches the display screen 11 of the touch device 1. The fingers of a user start their movement from a position 121 of a browsing image 12 on a display screen 11, which is the page 1 of 16, in this embodiment, and extend outward to enlarge the scale ratio of zooming. Accordingly, a zoomed region 12" is formed, and the scale ratio is thus determined. (Step S1). In other words, a user uses finger ends to touch the display screen 11 of the touch device 1 from the position of U1 and U2 respectively, and drag outward to enlarge the browsing page 12 with a specific scale ratio of zooming, and thus a zoomed region 12" is formed. The image covered by the zoomed region 12" is displayed on the display screen 11 as shown in FIG. 4.

Figure 4:
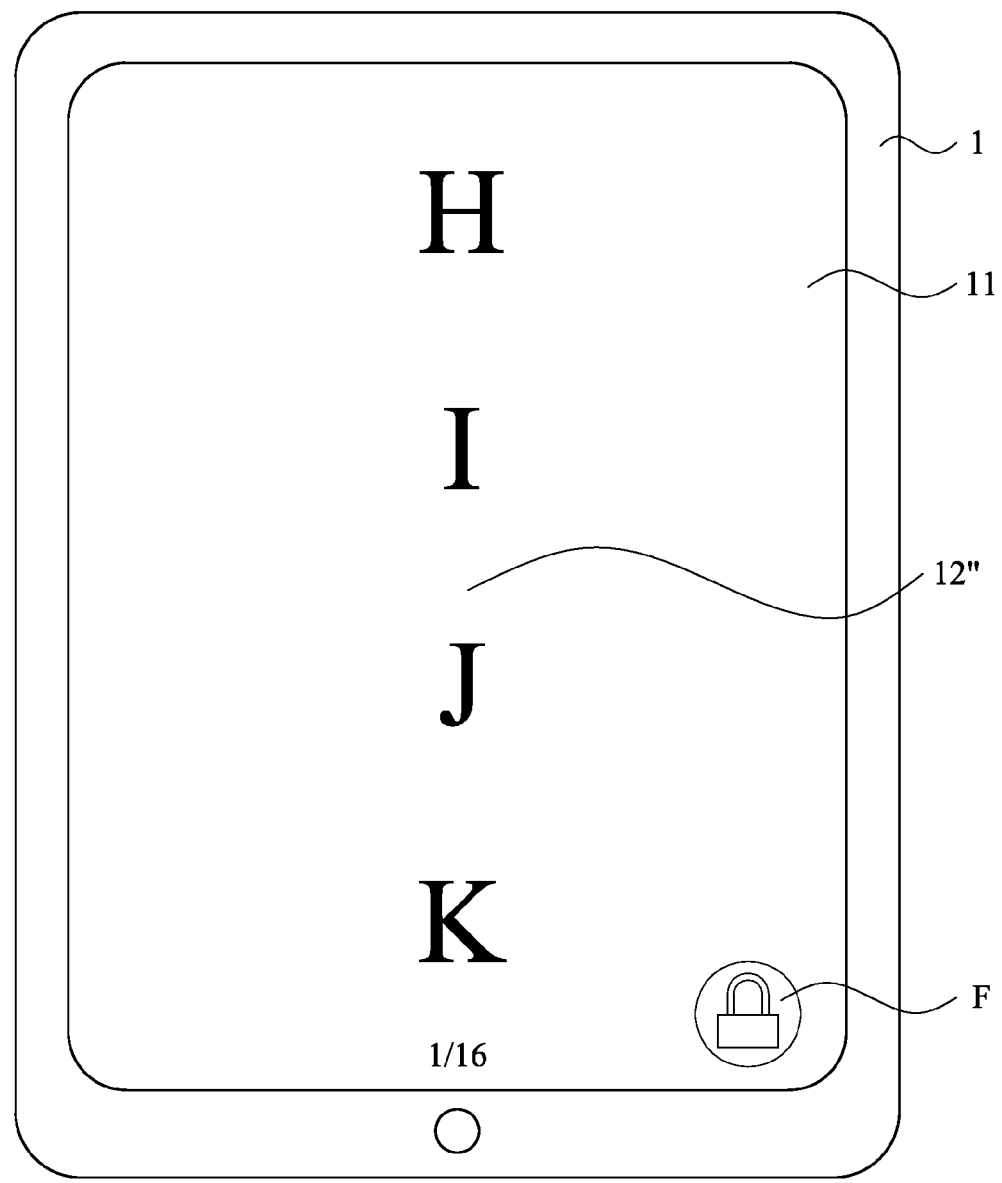

Next, in FIG. 4, a screen-locking icon F that is activated to lock the scale ratio of zooming, referring to the screen-locking function, is shown on the display screen 11. The scale ratio of zooming is locked when the screen-locking icon F is touched (Step S2). In other words, all contents of the zoomed region 12", which is letters of H, I, J and K, are fully displayed on the display screen 11, and at the same time the scale ratio of zooming is also fixed. The further zooming operation will be performed according to the fixed scale ratio of zooming (Step S3). In Step S4, the user is allowed to further adjust the scale ratio of zooming by touching the display screen 11 and changing the zoomed region 12" to determine another scale ratio of zooming.

Figure 5:
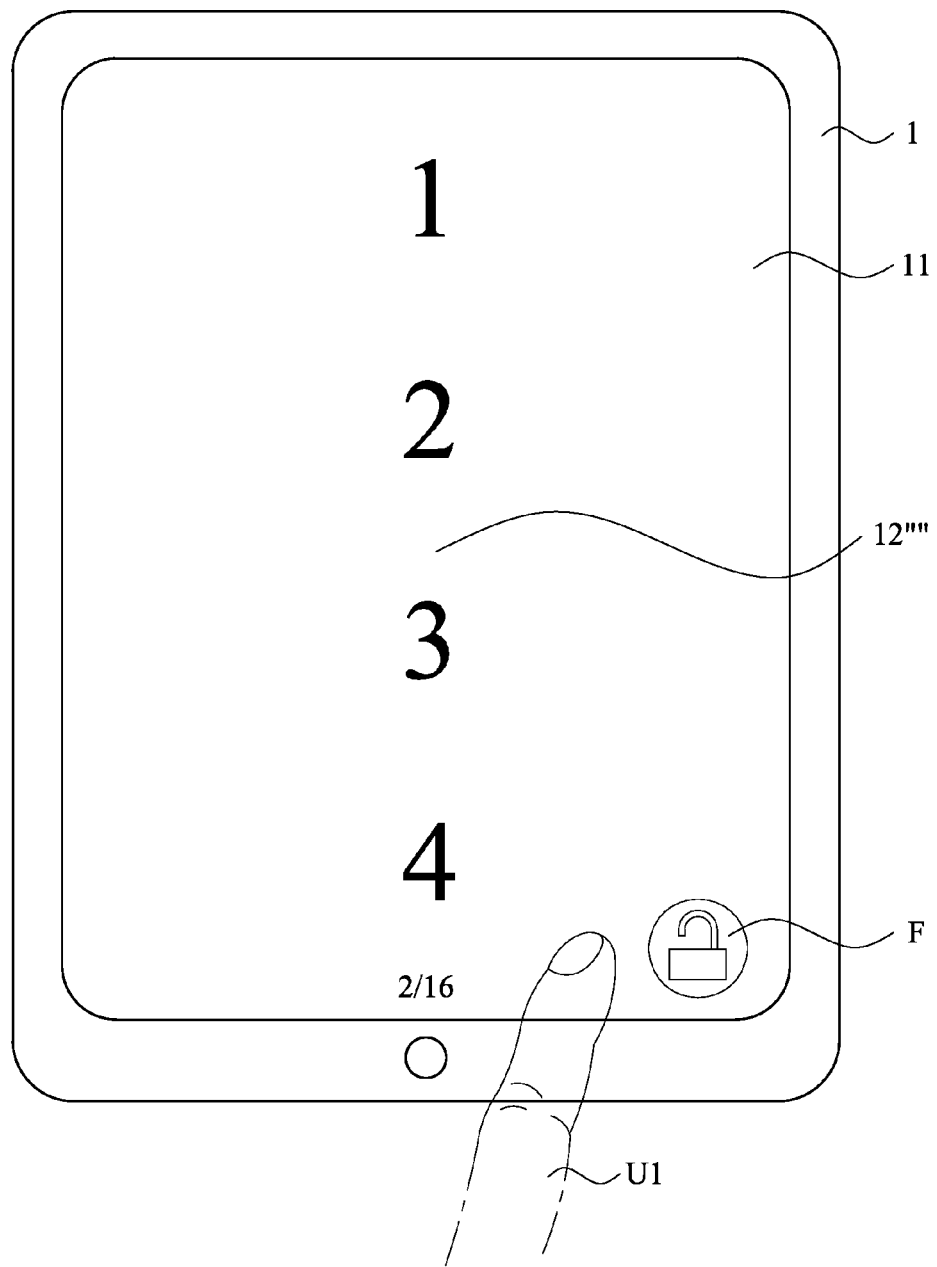
Figure 6:
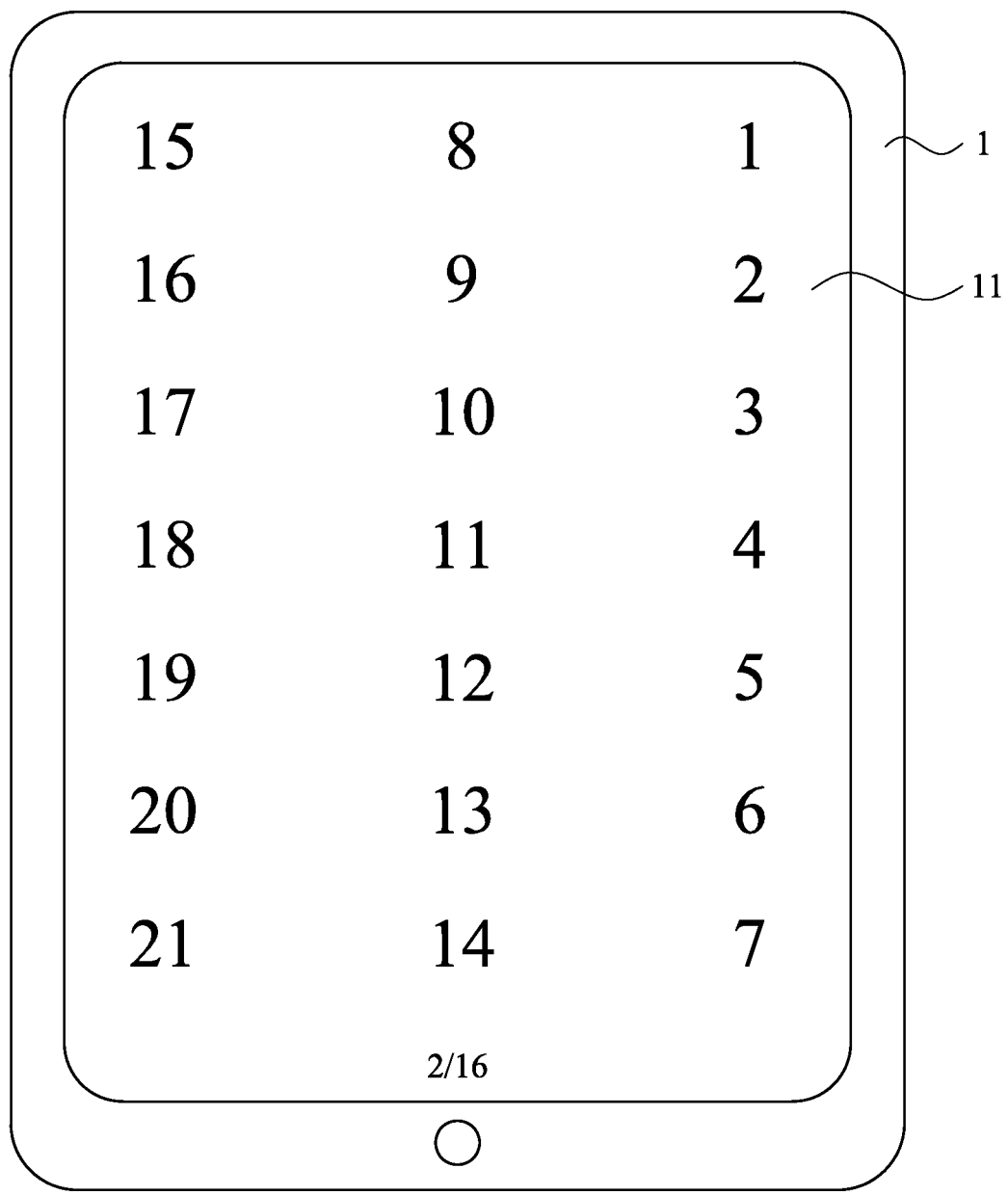

No matter the step S4 is performed or not, when the other browsing images such as the page 2 of 16 in this embodiment are viewed, a user views this browsing images with the same size as the zoomed region 12", which is referred to a zoomed region 12"" in FIG. 5, whose scale ratio of zooming is maintained (Step S5). In other words, as shown in FIG. 5, the scale ratio and the scope size of the letters of 1, 2, 3 and 4 shown in the zoomed region 12"" is the same as these of zoomed region 12" with letters of H, I, J and K. That is, the other browsing images are viewed with the same scale ratio of zooming and with a viewing size same as the zoomed region 12".

Then, as shown in FIG. 5, the scale ratio of zooming is restored to the original one when the user triggers the screen-locking F again, which is now referring to as a unlocking state. Thereafter the browsing image will be view with the restored original scale ratio of zooming at the same time (Step S6).

It is noted that the control method for zooming out is similar to the above control method for zooming in as described in FIG. 2 to FIG. 6. Similarly, a user touches the display screen 11 of the touch device 1. The fingers of a user start their movement from a position 121 of a browsing image 12, and move inward to minify the scale ratio of zooming. Accordingly, a zoomed region 12" is formed, and the scale ratio is thus determined. (Step S1). In other words, a user uses finger ends to touch the display screen 11 of the touch device 1 from the position of U1 and U2 respectively, and drag inward to minify the browsing page 12 with a specific scale ratio of zooming, and thus a zoomed region 12" is formed. The image covered by the zoomed region 12" is displayed on the display screen 11 as shown in FIG. 4.

Next, in FIG. 4, a screen-locking icon F that is activated to lock the scale ratio of zooming, referring to the screen-locking function, is shown on the display screen 11. The scale ratio of zooming is locked when the screen-locking icon F is touched (Step S2). In other words, all contents of the zoomed region 12", which is letters of H, I, J and K, are fully displayed on the display screen 11, and at the same time the scale ratio of zooming is also fixed. The further zooming operation will be performed according to the fixed scale ratio of zooming (Step S3). In Step S4, the user is allowed to further adjust the scale ratio of zooming by touching the display screen 11 and changing the zoomed region 12" to determine another scale ratio of zooming.

No matter the Step S4 is performed or not, when the other browsing images such as the page 2 of 16 in this embodiment are viewed, a user views this browsing images with the same size as the zoomed region 12", which is referred to a zoomed region 12"" in FIG. 5, whose scale ratio of zooming is maintained (Step S5). In other words, as shown in FIG. 5, the scale ratio and the scope size of the letters of 1, 2, 3 and 4 shown in the zoomed region 12"" is the same as these of zoomed region 12" with letters of H, I, J and K. That is, the other browsing images are viewed with the same scale ratio of zooming and with a viewing size same as the zoomed region 12".

Then, as shown in FIG. 5, the scale ratio of zooming is restored to the original one when the user triggers the screen-locking F again, which is now referring to as a unlocking state. Thereafter the browsing image will be view with the restored original scale ratio of zooming at the same time (Step S6).

One skilled in the art will appreciate that the browsing image on the touch device contains one or more members selected from the group including text, graph, symbol, and video and the present invention is not limited by the embodiment as shown in FIG. 2 to FIG. 6, although the preferred embodiment of the present invention has been described.

As can be appreciated from the above embodiments, the controlling method for fixing a scale ratio of browsing images of a touch device of the present invention has merits which meet the requirement for a patent. The above description should be considered as only the discussion of the preferred embodiments of the present invention. However, a person skilled in the art may make various modifications to the present invention. Those modifications still fall within the spirit and scope defined by the appended claims.

What is claimed is:

1. A controlling method for fixing a scale ratio of browsing images of a touch device, which performs a displaying area control of a browsing image shown on a display screen, the controlling method comprises the steps of:
    (a) determining a scale ratio of zooming on a display screen, which is determined by sliding finger apart/together to thus zoom in or zoom out the browsing image, and the scale ratio of zooming is accordingly determined from an original scale ratio to the determined scale ratio;
    (b) displaying a screen-locking icon on the display screen, wherein the scale ratio is locked in a locked state when the screen-locking icon is tapped
    (c) maintaining the locked scale ratio whenever any other browsing images are displayed; and
    (d) restoring the original scale ratio from the determined scale ratio when the screen-locking icon is tapped to change the scale ratio from the locked state to an unlocked state.

2. The controlling method as claimed in claim 1, wherein the scale ratio of the other browsing images is restored to the original scale ratio when the screen-locking icon is triggered to be in an unlocking state.

3. The controlling method as claimed in claim 1, wherein in step (a), the zooming region is determined by pinching the browsing image from the selected position and extending outward to enlarge the scale ratio of zooming, and the scale ratio of zooming is thus determined.

4. The method as claimed in claim 1, wherein in step (a) the zooming region is determined by pinching the browsing image from the selected position and extending inward to minify the scale ratio of zooming, and the scale ratio of zooming is thus determined.

5. The controlling method as claimed in claim 1, wherein the browsing image on the touch device contains one or more of text, graph, symbol, and video.

6. The controlling method as claimed in claim 1, further comprising, after step (b), a step of adjusting the scale ratio of zooming by touching the display screen and changing the zooming region to determine another scale ratio of zooming.

7. The controlling method as claimed in claim 1, wherein the touch device is a tablet computer, a smart phone, or an electronic device with touch function.

\* \* \* \* \*